United States Patent
Trachanas et al.

(10) Patent No.: US 10,596,808 B2
(45) Date of Patent: *Mar. 24, 2020

(54) METHOD FOR DENSITY COMPENSATION BY DROP SIZE ADAPTATION

(71) Applicant: HEIDELBERGER DRUCKMASCHINEN AG, Heidelberg (DE)

(72) Inventors: Ilias Trachanas, Mannheim (DE); Gerd Junghans, Schwetzingen (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 320 days.

This patent is subject to a terminal disclaimer.

(21) Appl. No.: 15/391,985

(22) Filed: Dec. 28, 2016

(65) Prior Publication Data

US 2017/0217163 A1    Aug. 3, 2017

(30) Foreign Application Priority Data

Jan. 28, 2016  (DE) .................. 10 2016 201 245

(51) Int. Cl.
| | | |
|---|---|---|
| *B41J 2/045* | (2006.01) | |
| *B41J 29/393* | (2006.01) | |
| *G06K 15/02* | (2006.01) | |
| *H04N 1/405* | (2006.01) | |
| *B41J 2/205* | (2006.01) | |
| *B41J 2/21* | (2006.01) | |

(Continued)

(52) U.S. Cl.
CPC ....... *B41J 2/04558* (2013.01); *B41J 2/04508* (2013.01); *B41J 2/04581* (2013.01); *B41J 2/04593* (2013.01); *B41J 2/04595* (2013.01); *B41J 2/2054* (2013.01); *B41J 2/2146* (2013.01); *B41J 29/393* (2013.01); *G06K 15/1836* (2013.01); *H04N 1/4055* (2013.01); *H04N 1/52* (2013.01); *H04N 1/58* (2013.01); *B41J 2029/3935* (2013.01); *G06K 2215/0094* (2013.01); *G06K 2215/101* (2013.01)

(58) Field of Classification Search
CPC .. B41J 2/04558; B41J 2/0451; B41J 2/04593; B41J 2/04595; B41J 2/2054; B41J 2/2146; B41J 29/393; G06K 2215/101; G06K 2215/0094; G06K 15/1836; G06K 15/107; H04N 1/4055
See application file for complete search history.

(56) References Cited

U.S. PATENT DOCUMENTS

| | | |
|---|---|---|
| 6,830,306 B2 | 12/2004 | Couwenhoven et al. |
| 7,327,503 B2 | 2/2008 | Yashima et al. |

(Continued)

FOREIGN PATENT DOCUMENTS

| | | |
|---|---|---|
| DE | 102014205163 A1 | 9/2015 |
| EP | 1308279 A2 | 5/2003 |

(Continued)

*Primary Examiner* — Thinh H Nguyen
(74) *Attorney, Agent, or Firm* — Laurence A. Greenberg; Werner H. Stemer; Ralph E. Locher

(57) ABSTRACT

A method for modifying color density values in a dot-based printing system uses a control unit. The control unit implements the modification of the color density values after a raster image has been created and modifies the number and/or size of print dots to be applied to a printing substrate in order to attain pre-defined color density target values.

11 Claims, 1 Drawing Sheet

(51) Int. Cl.
*H04N 1/52* (2006.01)
*H04N 1/58* (2006.01)

(56) References Cited

U.S. PATENT DOCUMENTS

| | | |
|---|---|---|
| 7,936,479 B2 | 5/2011 | Bracke et al. |
| 2006/0221125 A1 | 10/2006 | Konno |
| 2006/0262151 A1 | 11/2006 | Chiwata |
| 2012/0327478 A1* | 12/2012 | Shepherd ............... H04N 1/405 |
| | | 358/3.06 |
| 2018/0257390 A1* | 9/2018 | Mayer ....................... G01J 3/46 |

FOREIGN PATENT DOCUMENTS

| | | |
|---|---|---|
| EP | 1475233 A1 | 11/2004 |
| EP | 1732306 A1 | 12/2006 |

\* cited by examiner

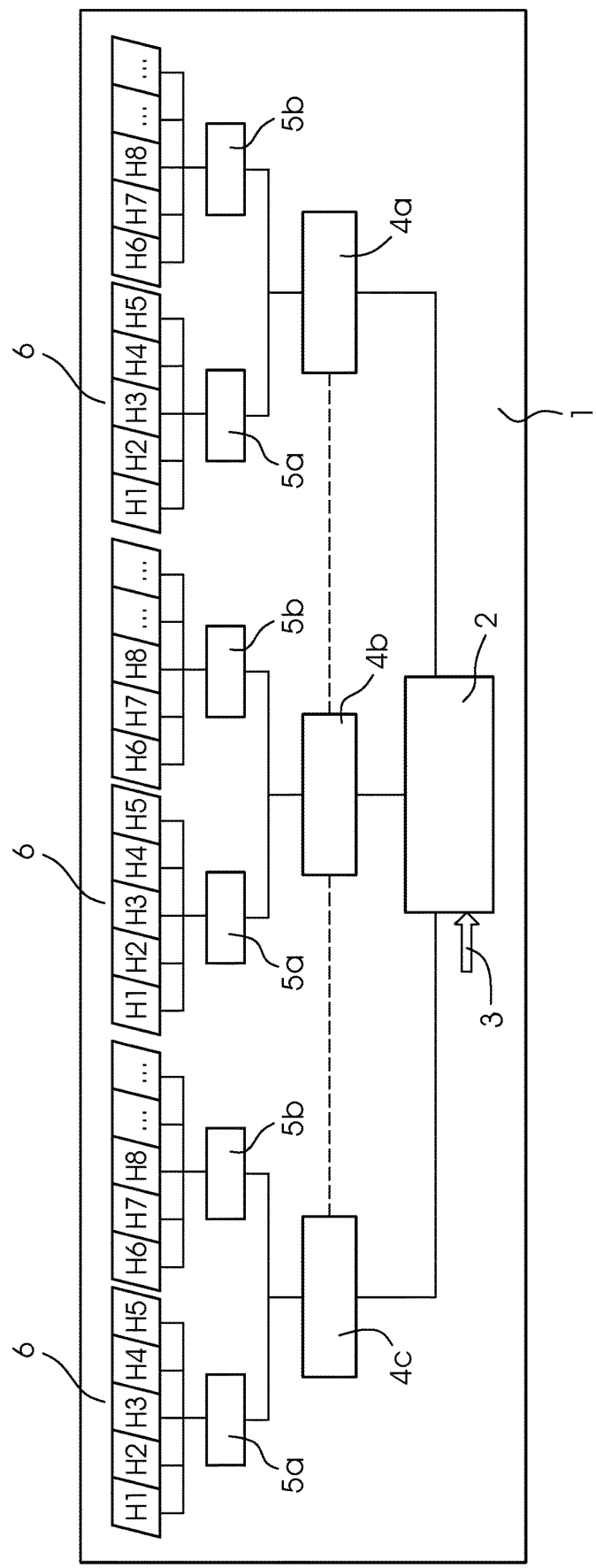

METHOD FOR DENSITY COMPENSATION BY DROP SIZE ADAPTATION

CROSS-REFERENCE TO RELATED APPLICATION

This application claims the priority, under 35 U.S.C. § 119, of German Patent Application DE 10 2016 201 245.2, filed Jan. 28, 2016; the prior application is herewith incorporated by reference in its entirety.

BACKGROUND OF THE INVENTION

Field of the Invention

The present invention relates to a method for modifying color density values in a dot-based printing system using a control unit.

In printing machines and printers using inkjet technology in particular, color density fluctuations occur again and again, causing brightness differences on the printing substrates in a direction perpendicular to the printing direction. Those density fluctuations are caused by the fact that for manufacturing reasons, the nozzles in the print heads frequently emit drops of different volumes. In accordance with the prior art, that density fluctuation problem is corrected by an image correction before a raster image of the different color separations is created. Thus, for printing nozzles that do not work properly, European Patent Application EP 1 308 279 A2, corresponding to U.S. Pat. No. 7,327,503, proposes to manipulate color values in the image to create the impression in an observer's eye that the colors in the printed image are represented correctly even though some nozzles are defective. A first step in the proposed method is to establish and save the conditions of the nozzles in the print head by a test print and test image. A density distribution is saved for every nozzle. In a correcting unit provided before the raster image processor, multiple color separations are influenced to compensate for density differences. That correction process is carried out in a correcting unit disposed before the raster image processor. Before the printing process, the image is converted into a raster image, and subsequently, the image is printed by actuating the nozzles. A disadvantage of that process is that for every density correction, an entirely new raster image needs to be created in a time-consuming process.

A similar method is proposed in European Patent Application EP 1 475 233 A1, corresponding to U.S. Pat. No. 6,830,306, which is used as a compensation method for drops of different volumes in inkjet printers. That method likewise relies on saving an optical density parameter for every nozzle in the print head and using the saved density parameter to influence the printed image in a corresponding way before creating the raster image to reduce undesired optical density deviations in the printed image. Since the correction takes place before the raster image is created, that method likewise requires the creation of a new raster image for every density correction in a time-consuming process.

A printer disclosed in U.S. Patent Application US 2006/0262151 A1 has the same disadvantage. That device likewise detects density fluctuations by using an image sensor and corrects them by using a correction unit that modifies the density fluctuations in the digital image before the raster image is created. So-called density correction coefficients saved in a memory are used for that purpose. That printer, too, suffers from the disadvantage of having to create a new raster image whenever a density fluctuation correction is made.

SUMMARY OF THE INVENTION

It is accordingly an object of the invention to provide a method for modifying color density values in a dot-based printing system with a control unit, which overcomes the herein afore-mentioned disadvantages of the heretofore-known methods of this general type and in which color density fluctuations may be corrected in a quick and flexible way.

With the foregoing and other objects in view there is provided, in accordance with the invention, a method for modifying color density values in a dot-based printing system with a control unit, which is particularly suitable for modifying color density values in inkjet printing machines. However, it may also be used in other dot-based printing systems. The method of the invention relies on the use of a control unit that is supplied with a digital original. Furthermore, the control unit is supplied with desired modifications of color density values in the print image. These modifications may be intended modifications of color density values defined by an operator. In general, however, the modification of color density values will amount to compensating for undesired color density value fluctuations caused by the construction of the printing system to avoid brightness differences in the printed image. The invention envisages that the color density values are modified after a raster image has been created (after a printing image has been scanned) and that the number and size of the print dots to be applied to the printing material are modified in order to achieve pre-defined color density values. Since the color density values are modified after the creation of the raster image, the color density value correction process does without the time-consuming, slow process of creating the raster image. Thus, in accordance with the present invention, the image data of the raster images of the individual color separations are used in the control unit and no additional raster image needs to be created. The invention further envisages that based on the available raster values, the number or size of the print dots to be applied to the printing material are modified. A modification of the number or size of the print dots to be applied to the printing material results in a modification of the color density and thus a modification of the brightness on the printing material. Thus, undesired color density fluctuations in particular may be easily and quickly corrected, eliminating brightness differences in the printed image in a direction perpendicular to the printing direction. This allows the use of print heads that emit drops of different volumes for manufacturing reasons. Eliminating the need for a new raster image means that the printing process is greatly accelerated, causing inkjet printers to become more widely accepted in the market because the machines available on the market today require very long set-up and correction times prior to the printing process.

Another embodiment of the invention envisages that the dot-based printing system is an inkjet printing machine and includes at least one digital graphics card and that the at least one digital graphics card modifies the size of the print dots to be applied to the printing material by modifying the dot size to be emitted by the inkjet printing machine. A modification of the drop size allows the color density on the printing material to be modified. For this purpose, a target density is preferably defined and all nozzles are set to this target density. Thus, all nozzles are set to the defined target density. The adaptation of the color density is then achieved by increasing or decreasing dots in the raster image that has already been created. This means that the raster image is kept and the number and position of the drops remain the same.

A preferred further development of the present invention envisages that the sizes of the inkjet drops to be emitted in four different sizes, i.e. the emitted drops, have a size zero (no drop), S (small), M (medium), or L (large).

An added embodiment of the invention envisages that the control unit is connected to one or more print head actuation electronics cards for actuating printing nozzles in one or more print heads and that the print head actuation electronics cards carry out the modification of the color density values to actuate the printing nozzles. The print head actuation electronics cards are used to convert the digital raster image data of the color separations into control signals for operating the nozzles in the print head. Since the present invention uses the raster image, the print head actuation electronics cards need to carry out the density correction by manipulating the digital data of the raster image values and adapting the density thereof. A print head actuation electronics card may actuate one or more print heads. It is likewise possible to use multiple print head actuation electronics cards in parallel in one printing unit.

An additional embodiment of the invention envisages the provision of one or more associated digital graphics cards for one or more print colors between the control unit and the print head actuation electronics cards. The digital graphics cards contain the binary raster image data of the control unit and convert them into corresponding digital signals that may be processed by the print head actuation electronics cards. In this context, a digital graphics card is preferably provided for every print color.

It is advantageously also envisaged that the control unit is supplied with the image data of an image inspection system that scans printing materials that have been produced in the dot-based printing system. The image inspection system may be disposed in the printing system itself or outside the printing system as an external device. Printing materials are removed from the printing system and inspected or are inspected directly inside the printing system by the image inspection system at regular intervals and in particular during the start-up phase. The actual color values that have been obtained in this way are fed to the control unit, which compares them to the target color values of the digital original. If color density deviations occur, correction signals that correspond to compensation values are forwarded to the print head actuation electronics cards, which manipulate the drops to be emitted in terms of their size and number to compensate for the detected color density deviations. It is to be understood that during the entire printing process, a printing material that has been produced in the printing system may be scanned at any time for the purpose of continuous quality control and the correction process may be repeated. In this way, a closed control loop may be created and density deviations that have been detected by the image inspection system may be automatically compensated for during an ongoing print job. This makes the operator's job much easier because the quality of the print in terms of color density is automatically optimized.

In yet another embodiment of the invention it is envisaged that to minimize quantization noise, a correction function, in particular sigma delta modulation, is used for the modification of the color density values of the print dots to be applied to the printing material. The image data on the print head actuation electronics cards have a very low screen resolution because the drop size may vary only between the four options zero, S, M, and L. This very low resolution results in much quantization noise. In order to minimize noise density within the useful frequency spectrum of the image data, the invention proposes the use of a correction function. This function suppresses the noise. The preferred function to be used is sigma-delta modulation, i.e. the modification of the image data is sigma-delta modulation. This means that a constant percentaged density modification is attained in that for every pixel in the image data, the heretofore existing deviation from the color density target value is measured and when a threshold is reached, a pixel value is discreetly modified in the right direction (plus or minus) to minimize the deviation error.

A concomitant embodiment of the invention envisages that the print dots to be applied to the printing material are disposed in lines and columns, that the correction method is sigma-delta modulation, and that when sigma-delta modulation is applied, it is initialized in every image column with a random value. The raster image data are divided into lines and columns, providing every image dot with a line and column address. A risk of modifying the pixel values by sigma-delta modulation is that a Moiré pattern may form because the pixel value modifications that are made are screen-related. In order to avoid the Moiré effect, the sigma-delta modulation is initialized with a random value in every column. These random values break up the regular Moiré structure, making it impossible for a Moiré effect to be discerned by the human eye.

Other features which are considered as characteristic for the invention are set forth in the appended claims.

Although the invention is illustrated and described herein as embodied in a method for density compensation by drop size adaptation, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

The FIGURE of the drawing is a block diagram of an inkjet printing machine having inkjet print heads being actuated in a manner suitable for implementing the method of the present invention.

DETAILED DESCRIPTION OF THE INVENTION

Referring now in detail to the single figure of the drawing, there is seen an inkjet printing machine 1 using a page-width printing bar. In the present example, the printing bar has three print heads 6 containing printing nozzles. In the figure, every print head 6 has ten printing nozzles and every print head 6 applies a single color to the printing material. Every print head 6 is actuated by two print head actuation electronics cards in the form of inkjet converter cards 5a, 5b. It is the job of the inkjet converter cards 5a, 5b to convert switch-on time signals of the individual nozzles into control signals for actuating the print heads 6. For reasons of computing capacity, two inkjet converter cards 5a, 5b are provided for every print head 6 in the figure.

The printing system 1 additionally has digital graphics cards 4a, 4b, 4c, with one digital graphics card controlling one color channel. The digital graphics cards 4a, 4b, 4c convert a screened halftone image of a color separation in question into switch-on time signals of the individual nozzles of the print heads 6. The digital graphics cards 4a, 4b, 4c in turn are connected to a control unit or controller 2, which (among other tasks) distributes binary raster image data of the color separations to the digital graphics cards 4a, 4b, 4c. The control unit 2 may at the same time be the control unit of the entire inkjet printing machine 1 and may have other tasks such as converting the digital original into the individual binary raster image color separations. This means that the control unit 2 may in particular contain a raster image processor.

The control unit 2 is furthermore connected to an image inspection system 3 that scans and digitizes printed printing materials inside or outside the inkjet printing machine 1. In this way, actual color values of the printing materials may be measured inside or outside the inkjet printing machine 1 to be used for quality control purposes. The digitized actual color values of the image inspection system 3 are fed to the control unit 2 of the inkjet printing machine 1 and may be used to manipulate the color density values. The manipulation may correct density differences that result from drop volume differences.

In a simplified model, for instance, the assumption is made that a nozzle A has a drop volume of 2.2 picoliters, and a nozzle B has a drop volume of 2 picoliters. In this simplified model, the drop volumes need to be adapted to make color density adaptations. For instance, for this purpose, for an area coverage of 30%, the drop volume of nozzle B is increased by 10%. The drop volume increase is achieved by statistically increasing the drop size for existing screen dots. In the aforementioned example, of 100 size S drops containing 200 picoliters and thus corresponding to 2 picoliters per drop, ten may be converted into size M drops to increase the drop volume for 100 drops to 220 picoliters. One size M drop corresponds to 4 picoliters. Thus the average volume of a drop is increased to 2.2 picoliters. The method for brightening a nozzle in the print head 6 works in the reverse way by selecting smaller drops.

The nozzles in the print heads 6 are preferably actuated by piezo-elements, which build up pressure on an ink-filled chamber with the aid of an electrical voltage to create a drop that leaves the nozzle opening. These signals are created by the inkjet converter cards 5a, 5b. An inkjet converter card 5a, 5b converts a digital two-bit signal into an analog control signal of the piezo-element of the nozzle. The analog control signal is formed of one or more voltage curves referred to as waveforms. In this way, a single nozzle may emit drops of between 2 and 20 picoliters.

The control unit 2 may evaluate the images of the image inspection system 3 and may calculate compensation values therefrom for the compensation of color density fluctuations. The control unit 2 forwards these compensation values to the respective inkjet converter cards 5a, 5b assigned to the respective print color. In the process, one compensation value is preferably transmitted per nozzle or image column. In this way, the emission of the drops is manipulated directly on the converter card 5a, 5b without requiring the control unit 2 to create new color separations in the raster image processor. The main concept of the present invention is to manipulate the data on the inkjet converter cards 5a, 5b in such a way as to achieve a stochastic color density increase or decrease.

Since the data on an inkjet converter card 5a, 5b have a very low resolution, because only drops in the four sizes zero, S, M, or L may be emitted, the result is a high degree of quantization noise. In order to reduce noise density within the useful frequency spectrum of the image data, sigma-delta modulation is used on the inkjet converter card 5a, 5b. In this process, the modification of the image data in the form of pixel values is sigma-delta modulated. This means that a constant percentaged density modification is attained in that for every pixel, the heretofore existing deviation from the color density target value is measured and when a threshold is reached, a pixel value is discreetly modified in the right direction (plus or minus) to minimize the deviation. The result is a succession of pixel value modifications that on average result in the desired density modification. The pixel value modifications that are made are screen-related and may cause Moiré effects. In order to avoid these Moiré effects, sigma-delta modulation is initialized with a random value in every image column. As a result, no Moiré patterns may form and no Moiré effect is visible to the human eye.

Due to the method of the invention, the digital graphics cards 4a, 4b, 4c and the control unit 2 do not have to produce or process new raster images in a density correction process. It is sufficient for the control unit 2 to calculate compensation values per nozzle and to directly forward them to the inkjet converter cards 5a, 5b to implement color density compensation.

In the rare case where a manipulation on the inkjet converter cards 5a, 5b is not sufficient to compensate for the color density deviations that have been found, an additional correction of the color density values may be carried out by creating new raster images in the control unit 2.

The invention claimed is:

1. A method for modifying color density values in a dot-based printing system, the method comprising the following steps:
    using a control unit to implement a modification of the color density values after creating a raster image; and
    using the control unit to modify at least one of a number or size of print dots to be applied to a printing material to attain predefined color density target values.

2. The method according to claim 1, which further comprises using the control unit to correct color density fluctuations by modifying the number or size of the print dots to be applied to the printing material.

3. The method according to claim 1, which further comprises:
    providing an inkjet printing machine as the dot-based printing system;
    providing the inkjet printing machine with at least one digital graphics card; and
    using the at least one digital graphics card to modify the size of the print dots to be applied to the printing material by modifying a drop size to be emitted by the inkjet printing machine.

4. The method according to claim 3, which further comprises emitting inkjet droplets in four different sizes.

5. The method according to claim 1, which further comprises:
    providing one or more print heads having printing nozzles;
    providing one or more print head actuation electronics cards connected to the control unit for actuating the printing nozzles in the one or more print heads; and using the print head actuation electronics cards to carry out the modifications of the color density values to actuate the printing nozzles.

6. The method according to claim 5, which further comprises providing one or more associated digital graphics cards for one or more print colors between the control unit and the print head actuation electronics cards.

7. The method according to claim 6, which further comprises providing a digital graphics card for every print color and using every digital graphics card to control processing of one or more print colors.

8. The method according to claim 1, which further comprises supplying the control unit with image data of an image inspection system scanning printing materials having been produced in the dot-based printing system.

9. The method according to claim 1, which further comprises using a correcting function in the modification of the color density values of the print dots to be applied to the printing material to minimize quantization noise.

10. The method according to claim 9, which further comprises using sigma-delta modulation as the correcting function.

11. The method according to claim 9, which further comprises:
    placing the print dots to be applied to the printing material in lines and columns;
    using sigma-delta modulation as the correcting function; and
    upon applying the sigma-delta modulation, initializing the sigma-delta modulation with a random value in every image column.

* * * * *